United States Patent [19]

Eberhardt et al.

[11] 4,206,241
[45] Jun. 3, 1980

[54] METHOD OF PREPARING FOWL

[76] Inventors: Timothy J. Eberhardt, 3932 Dunnica, St. Louis, Mo. 63116; Atma R. Bibhuti, 4137a Blaine Ave., St. Louis, Mo. 63110

[21] Appl. No.: 877,278

[22] Filed: Feb. 13, 1978

Related U.S. Application Data

[63] Continuation of Ser. No. 763,834, Jan. 31, 1977, abandoned, which is a continuation of Ser. No. 576,042, May 9, 1975, abandoned.

[51] Int. Cl.$^2$ .................... A23L 1/315; A22C 21/00
[52] U.S. Cl. .................................. 426/291; 426/303; 426/644; 426/518; 426/296
[58] Field of Search ............... 426/90, 92, 289, 291, 426/293, 295, 296, 302, 303, 644, 646, 480, 513, 523, 524, 418, 589, 638, 518; 99/353; 17/11, 46, 52

[56] References Cited

U.S. PATENT DOCUMENTS

| | | | |
|---|---|---|---|
| 3,006,766 | 10/1961 | Zolezzi | 426/92 |
| 3,166,427 | 1/1965 | Herrmann | 426/513 |
| 3,174,863 | 3/1965 | Shoup | 426/523 |
| 3,756,833 | 9/1973 | Powell | 426/638 |
| 3,942,222 | 3/1976 | Strandine | 17/52 |

OTHER PUBLICATIONS

The Complete Barbecue Book–Robersen Prentice Hall N.Y. 1951 1230-31.

*Primary Examiner*—Hiram H. Bernstein
*Attorney, Agent, or Firm*—Ralph W. Kalish

[57] ABSTRACT

A method for preparing fowl for eating which comprises preliminarily effecting a series of spaced incisions upon the fowl which approximate, but do not extend to, the underlying bone; rubbing into the meat of the fowl, as well as the incisions, salt and then lime juice. A marinade comprising garlic, ginger, yogourt, cooking oil, salt, chili powder, and food coloring is then applied to the fowl and within the aforesaid incisions. A period of refrigeration is then accorded the fowl for conducing to absorption of the marinade and after such period the fowl is allowed to return to room temperature. Thereupon the same is subjected to an oven preheated to a temperature of approximately 800° F. for a predetermined period of time and subsequently after removal has applied thereto a spice preparation.

5 Claims, 1 Drawing Figure

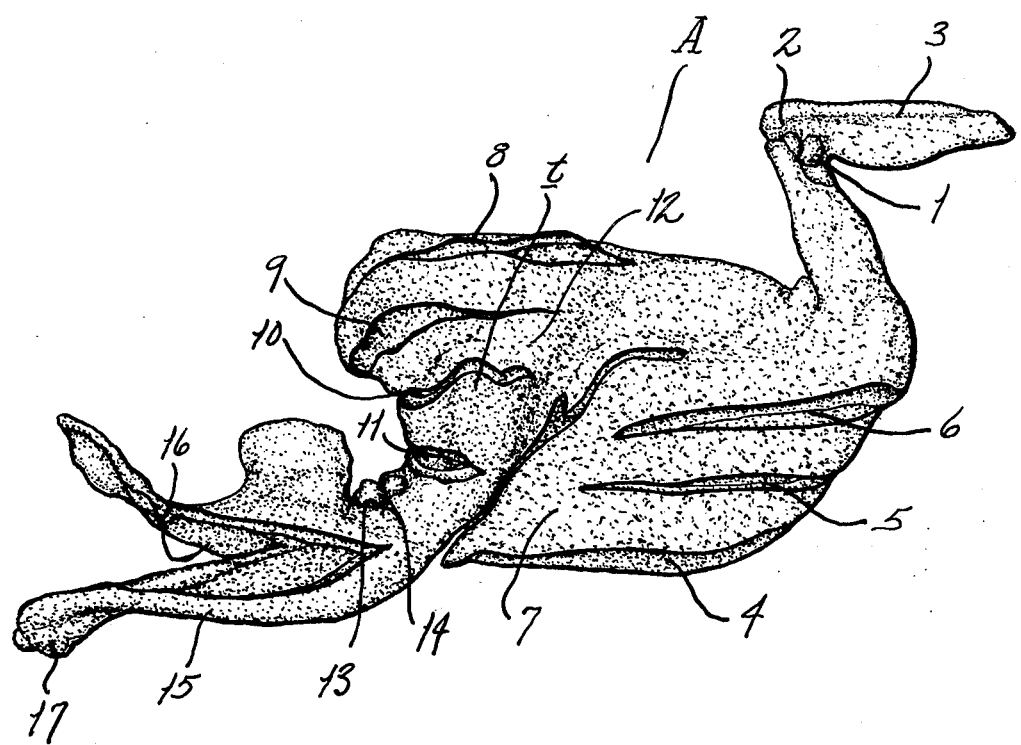

METHOD OF PREPARING FOWL

This is a continuation application of Ser. No. 763,834, filed Jan. 31, 1977, and now abandoned, which was a continuation of application Ser. No. 576,042, filed May 9, 1975, now abandoned.

BACKGROUND AND SUMMARY OF THE INVENTION

This invention relates in general to comestibles and, more particularly, to a method for preparing fowl.

Heretofore, there have been known various techniques for preparing fowl, such as, most commonly, chicken, including the more widely practiced methods in this country for broiling, frying, barbecue, and broasting. In the Far East, particularly India, there has been known a procedure for preparing chicken tandoori or tunduri, but such has not been generally accepted in the Occident in view of the particular spicing or seasoning, as well as the unavailability of the requisite cooking equipment adapted for the involved, lengthy procedure.

Therefore, it is an object of the present invention to provide a method for roasting fowl, such as chicken, which may be relatively rapidly accomplished through equipment currently available so as to be amenable to high volume production, as for a food take-out establishment, but without diminution of delectability.

It is another object of the present invention to provide a method for roasting fowl which provides for the even cooking of the meat thereby avoiding any of the usual uneven gradients in the cooked fowl, such as wherein the meat proximate the bone often borders on the raw.

It is a further object of the present invention to provide a method for preparing fowl wherein a savory blend of condiments is prepared and utilized in the manner for uniform permeation of the meat.

It is another object of the present invention to provide a method for preparing fowl which involves a novel manner in which to pretreat the fowl conducing to rapid cooking.

It is another object of the present invention to provide a method for preparing fowl which entails the discarding of the skin thereby removing any accumulated fat deposits and reducing the cholesterol content.

BRIEF DESCRIPTION OF THE DRAWING

The FIGURE is a perspective view of a portion of the fowl prepared in accordance with the method of the present invention for subjection to the successive treatment steps.

DESCRIPTION OF THE INVENTION

The present invention contemplates the presentation of fowl in an ingenious manner for producing an exceedingly appetizing and flavorable edible. In essence, the invention contemplates the initial steps of preparing the fowl, such as a chicken, as by various cutting techniques, for presenting the meat for rapid heat penetration and seasoning permeation. Subsequent thereto, the suitably cut fowl is preliminarily treated to condition same for facilitating the absorption of a condiment preparation which is then applied during the main seasoning step. The now seasoned fowl is permitting to refrigerate for a predetermined period of time until cooking is desired, and during which period the contiment absorption continues.

After permitting the thus prepared fowl to attain room temperature, the same is then placed in a preheated oven, at a predetermined temperature for an appropriately preselected period.

The present invention will be described with reference to a chicken for purposes of example only, since it is apparent that the method may be utilized with other fowl. Accordingly, such reference to chicken may not be considered in any way restrictive as to the scope of the present invention.

A typical frying chicken is provided and after the last joint of the wings and the buttock have been removed, the chicken is then skinned and washed in cool water. Customarily, the entire chicken will be appropriately cut in a manner to be described and then cut in half since the usual serving is a half chicken. However, for purposes of illustration, reference will be made to but a half of chicken, indicated generally A, as such is depicted in the FIGURE wherein, as will be more fully described, the critical and novel pattern of cuttings or incisions are shown. An incision, indicated 1, is made substantially half way through the inside of the wing joint 2 to such depth that the distal wing portion 3 is flexible or limp but still in an attached state. Then a series of cuts are made in the general direction of the breast bone; a first incision 4 being made about ¼" from the breast bone (not shown) and substantially parallel therewith. Such cut may be in the order of ¾" or at least to terminate immediately proximate the breast bone. Two additional cuts 5,6 are made in the breast, as indicated at 7, which are in the same general direction as cut 4, but which latter are at substantially 1" intervals. It will be noted that the incisions or cuts 4, 5, 6 do not extend the full length of the breast. The preparer will then insert a finger on the side of the breast bone, successively within the incisions 4, 5, 6 to separate the breast meat from the bone, but being careful not to tear the meat therefrom.

There are then made four, generally parallel incisions or slits 8, 9, 10, 11, respectively, within the thigh t; with the first such slit 8 being made proximate the back joint (not shown). It is to be particularly noted that said thigh incisions 8, 9, 10, 11 are not made through the edge of the thigh meat so as to retain uncut zones, generally at 12. Then a cut 13 is made on the inside of the leg joint 14, and with such cut extending downwardly of the adjacent leg portion 15 a distance in the order of ½" to ¾". The severing or cutting procedure is then completed by a cutting away of the meat on the outside of the leg portion 15 which cut runs longitudinally of such leg portion 15 and is indicated at 16. The leg meat remains attached in the zone proximate joint 14. It will thus be seen that by cut 16 the meat on the backside of the bone is cut away from the bone between a joint proximate joint 14 and the leg tip 17. The chicken half A is thus in appropriately cut state for the succeeding steps of the present invention. However, as indicated above, normally the cutting procedure is effected on each side of a chicken and then the latter is halved.

With the chicken halves A being thus provided with the series of incisions as above described, salt is then rubbed into the chicken meat and particularly within the various incisions 4, 5, 6, 8, 9, 10, 11, 13 and 16 and under the breast meat by reason of the prior loosening of the same. For a three pound frying chicken, a teaspoon and a quarter (1¼) of salt is adequate for this preliminary step. Then lime juice in a quantity of approximately 1½ ounce for the three pound chicken is also rubbed into the chicken meat, and particularly within the aforesaid incisions and under the breast meat.

Merinade, which may have been previously prepared, is then utilized to thoroughly coat the chicken halves A on both the inside and the outside with particular certainty as to applying same within the aforesaid incisions 4, 5, 6, 8, 9, 10, 11, 13 and 16, as well as especially under the breast meat. After the application of the merinade, each chicken half A is then placed within a flat receptacle with the meat side presented upwardly so as to tend to prevent any excess of the merinade from flowing off. Any excess of the marinade is applied upon the chicken halves A.

The merinade to be utilized comprises the following formulation for each three pound frying chicken:
1 garlic in skinned state; fresh ginger root approximately the same size as the garlic and with skin removed;
¾ cup plain yogourt;
1¼ teaspoon salt; 1 teaspoon chili powder; 3/16 teaspoon concentrated powdered red/orange food coloring;
1½ tablespoon cooking oil;
1 ounce water.

The aforesaid ingredients are intermixed in the following manner. The garlic and ginger root, together with the one ounce of water are blended in a blender, to a relatively fine consistency. The garlic-ginger mixture, in an amount of approximately 2 tablespoons, is then combined with the yogourt, chili powder, salt, food coloring, and cooking oil, together with any lime juice which may not have been absorbed by the chicken. These ingredients are mixed thoroughly by hand and strained into a large bowl into which the chicken halves have been previously placed. Thus, as indicated above, the merinade is applied to the chicken halves and thereafter the coated chicken halves are permitted to refrigerate for a period of at least 6 hours to permit the requisite time within which the merinade may seep into the chicken meat for substantially full absorption thereby. It is understood by refrigeration there is intended the usual refrigeration equipment found within residences or commercial eating establishments, being sufficiently below room temperature for normal food preservation.

After the refrigeration period, the chickens are taken out and permitted to return to room temperature. After having attained room temperature, the chicken halves A may be held vertically for a few seconds to permit any excess merinade to flow off, but it is understood that the chicken halves are not subjected to any shaking or vibratory movement.

The chicken halves are then placed upon a grilled, pizza-style pan and the various incisions 4, 5, 6, 8, 9, 10, 11, 13 and 16 are separated by hand for promoting even heat penetration. Thereupon chicken halves are placed into a preheated oven having a temperature of approximately 800° F. and are retained at such temperature for a period of 8½ to 10 minutes. The cooked chicken halves A are then removed and sprinkled lightly with a spice preparation having the following formulation per three pound chicken:
¼ oz. whole cardoman
⅜ oz. black salt
1½ ozs. finely ground black pepper The ingredients of the spice preparation are intermixed and ground into a very fine, substantially uniform powder before application. The chicken halves are then ready for eating. To assure of maximum tastefulness, the chicken halves should have been lightly charred by the cooking procedure which will develop if the said halves are subjected to the aforesaid heat within the prescribed time range.

The formulation for the merinading hereinabove set forth is preferable. However, relative minimum and maximum limits may be observed without adversely affecting the delectability of the chicken. Thus, the following table will provide the aforesaid limits for certain of the said merinade ingredients:
Salt: ¾ to 1½ teaspoon
Chili Powder: ½ to 1½ teaspoon
Cooking Oil: 2 teaspoons to 2 tablespoons
Red/orange food coloring: ⅛ to ¼ teaspoon
Blended ginger root and garlic: 4 teaspoons to 8 teaspoons The pre-marinading procedure may comprehend salt within a range of ¾ to 1 -1/34 teaspoons and lime juice between one ounce and a maximum of 2½ ounces.

Although there has been discussed hereinabove the utilization of fresh ginger root and garlic, it is to be understood that powdered ginger and garlic may be used, but in such condition 1½ teaspoon of each will be adequate when added to the other marinading ingredients.

As thus prepared, a chicken, as in the present instance, has proved a source of substantial gustable pleasure, providing a novel and unusual means for preparing chicken. The method of the present invention may be easily practiced by the average housewife, as well as being amenable to high volume, rapid production for restaurant and food take-out establishments.

Hereinabove with respect to the sprinkling of the cooked chicken with a spice preparation, reference is made to black salt. Since this particular condiment is not generally known, the formulation thereof is as follows:

| INGREDIENT | PERCENTAGE BY WEIGHT |
| --- | --- |
| Sodium Chloride | 98.18 |
| Water | 0.55 |
| Sulfide Sulfur | 0.54 |
| Sulfate (SO$_4$) | 0.52 |
| Potassium | 0.10 |
| Calcium | 0.007 |
| Magnesium | 0.0004 |
| Zinc | 0.0005 |

Having described our invention, what we claim and desire to obtain by Letters Patent is:

1. A method of preparing fowl comprising removing the skin of the fowl, making a plurality of spaced-apart incisions within the breast and within the thighs of the fowl meat, said breast incisions terminating proximate the breast bone, said breast incisions extending less than the full length of the breast and permitting of the insertion of a manipulating element for separating the breast meat from the breast bone within the zone of each incision so that the fowl meat remains attached to said breast bone, said breast incisions extending in the general direction of the breast bone, the breast incision nearest the breast bone being of less depth than such other breast incisions, said thigh incisions being proximate but spaced from the thigh joints, said thigh incisions not being made through the edge of the thigh meat so as to retain uncut zones in said thighs, said thigh incisions being generally parallel, applying salt to the now cut fowl and within the incisions, then applying lime juice to the fowl within the aforesaid incisions, then coating the fowl with a marinade, then subjecting the fowl to a below room temperature to promote penetration of the marinade, then bringing the fowl to room temperature, then cooking the fowl meat at substantially 800° F. for a period of about 8½ to 10 minutes.

2. The method of preparing fowl as defined in claim 1 and further characterized by making a plurality of said incisions within the fowl breast, said breast incisions terminating proximate the breast bone, said breast incisions extending less than the full length of the breast and permitting of the insertion of a manipulating element for separating the breast meat from the breast bone within the zone of the incision so that the meat remains attached to said breast bone.

3. The method of preparing fowl as defined in claim 2 and further characterized by the breast incisions extending in the general direction of the breast bone, the incision nearest the breast bone being of less depth than such other breast incisions.

4. The method of preparing fowl as defined in claim 3 and further characterized by there being a plurality of incisions within the thighs of said fowl, said thigh incisions not being made through the edge of the thigh meat so as to retain uncut zones in said thighs.

5. The method of preparing fowl as defined in claim 4 and further characterized by the thigh incisions being generally parallel.

* * * * *